US010755594B2

(12) United States Patent
Leung

(10) Patent No.: US 10,755,594 B2
(45) Date of Patent: Aug. 25, 2020

(54) METHOD AND SYSTEM FOR ANALYZING A PIECE OF TEXT

(71) Applicant: Chrysus Intellectual Properties Limited, Hong Kong (HK)

(72) Inventor: Wai Fung Leung, Hong Kong (HK)

(*) Notice: Subject to any disclaimer, the term of this patent is extended or adjusted under 35 U.S.C. 154(b) by 741 days.

(21) Appl. No.: 15/130,761

(22) Filed: Apr. 15, 2016

(65) Prior Publication Data

US 2017/0148337 A1 May 25, 2017

(30) Foreign Application Priority Data

Nov. 20, 2015 (HK) .................................... 15111493

(51) Int. Cl.
*G09B 7/02* (2006.01)
*G06F 40/205* (2020.01)
*G06F 40/253* (2020.01)

(52) U.S. Cl.
CPC ............. *G09B 7/02* (2013.01); *G06F 40/205* (2020.01); *G06F 40/253* (2020.01)

(58) Field of Classification Search
CPC ...... G09B 7/02; G06F 17/2705; G06F 17/274
USPC ........................................................ 434/353
See application file for complete search history.

(56) References Cited

U.S. PATENT DOCUMENTS

| | | | | | |
|---|---|---|---|---|---|
| 5,724,498 | A | * | 3/1998 | Nussbaum | G06K 15/02 345/471 |
| 5,794,177 | A | * | 8/1998 | Carus | G06F 40/268 704/9 |
| 5,870,608 | A | * | 2/1999 | Gregory | G06F 40/205 717/131 |

(Continued)

FOREIGN PATENT DOCUMENTS

| | | |
|---|---|---|
| CN | 101540041 A | 9/2009 |
| CN | 102144236 A | 8/2011 |

(Continued)

OTHER PUBLICATIONS

State Intellectual Property Office of the People's Republic of China (SIPO) International Searching Authority, International Search Report for International patent application PCT/CN2016/079003, dated Aug. 18, 2016, pp. 1-4, SIPO, People's Republic of China.

(Continued)

*Primary Examiner* — Xuan M Thai
*Assistant Examiner* — Sadaruz Zaman
(74) *Attorney, Agent, or Firm* — Carmichael & Co.

(57) ABSTRACT

The invention provides a computer-implemented method for analyzing a piece of text. The method comprises truncating one or more characters of the text into one or more block units each having at least one character. The method includes sorting the one or more block units for one or more unique block units and comparing the one or more unique block units with a grading database to thereby assign a grade to each of the one or more unique block units. An overall grade for the piece of text may be determined based on one or more of the grades assigned to each of the one or more unique block units. The overall grade of the text may be derived from successive truncating of the text into block units of increasing size and the successive processing of such block units.

10 Claims, 1 Drawing Sheet

(56) References Cited

U.S. PATENT DOCUMENTS

| | | | | |
|---|---|---|---|---|
| 6,120,297 | A * | 9/2000 | Morse, III | G09B 19/00 434/156 |
| 6,154,757 | A * | 11/2000 | Krause | G06F 3/0219 715/205 |
| 6,658,377 | B1 * | 12/2003 | Anward | G06F 40/211 704/9 |
| 7,069,508 | B1 * | 6/2006 | Bever | G06F 40/109 715/234 |
| 7,165,264 | B1 | 1/2007 | Westrick | |
| 7,313,513 | B2 * | 12/2007 | Kinder | G06F 17/27 434/178 |
| 8,306,356 | B1 * | 11/2012 | Bever | G06K 9/723 382/275 |
| 9,563,613 | B1 * | 2/2017 | Dinkel | G06F 40/14 |
| 2005/0069849 | A1 * | 3/2005 | McKinney | G09B 17/00 434/178 |
| 2007/0238084 | A1 * | 10/2007 | Maguire | G09B 7/02 434/353 |
| 2008/0141182 | A1 * | 6/2008 | Barsness | G06F 17/241 715/864 |
| 2009/0157714 | A1 * | 6/2009 | Stanton | G06F 40/279 |
| 2009/0228777 | A1 * | 9/2009 | Henry | G06F 16/40 715/230 |
| 2009/0248399 | A1 * | 10/2009 | Au | G06F 40/20 704/9 |
| 2010/0003659 | A1 * | 1/2010 | Edmonds | G09B 5/062 434/350 |
| 2010/0191748 | A1 * | 7/2010 | Martin | G06F 16/355 707/750 |
| 2010/0311030 | A1 * | 12/2010 | He | G09B 7/02 434/350 |
| 2011/0123967 | A1 * | 5/2011 | Perronnin | G09B 7/02 434/178 |
| 2012/0150534 | A1 * | 6/2012 | Sheehan | G09B 19/06 704/9 |
| 2017/0293604 | A1 * | 10/2017 | Zhu | G06F 40/232 |
| 2017/0329763 | A1 * | 11/2017 | Ganin | G06F 40/211 |
| 2018/0089334 | A1 * | 3/2018 | Raitz | G06F 16/90335 |
| 2019/0138641 | A1 * | 5/2019 | Pal | G06F 40/205 |
| 2019/0147084 | A1 * | 5/2019 | Pal | G06F 16/24554 707/769 |
| 2020/0104304 | A1 * | 4/2020 | Oliner | G06N 5/04 |

FOREIGN PATENT DOCUMENTS

| | | |
|---|---|---|
| CN | 102497270 A | 6/2012 |
| CN | 102662952 A | 9/2012 |
| CN | 103186911 A | 7/2013 |
| CN | 104462207 A | 3/2015 |
| JP | 2000148767 A | 5/2000 |
| JP | 2006155528 A | 6/2006 |
| JP | 2008129475 A | 6/2008 |
| JP | 2010256821 A | 11/2010 |
| JP | 2012208143 A | 10/2012 |

OTHER PUBLICATIONS

State Intellectual Property Office of the People's Republic of China (SIPO), Search Report for Hong Kong Short-Term Patent Application 15111493.2, dated Jan. 12, 2016, pp. 1-4, SIPO, People's Republic of China.

\* cited by examiner

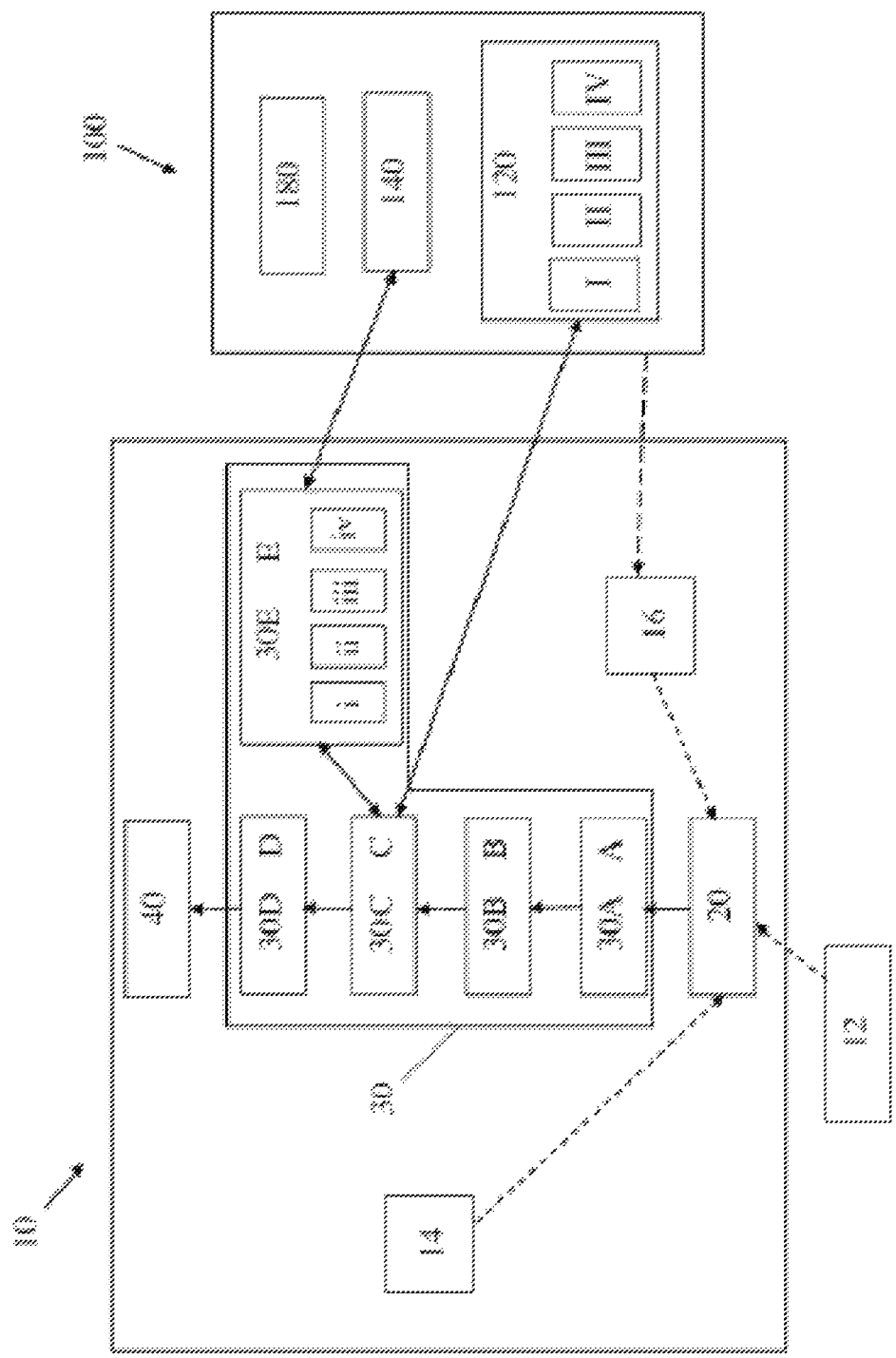

METHOD AND SYSTEM FOR ANALYZING A PIECE OF TEXT

FIELD OF THE INVENTION

The invention relates to a computer-implemented method and system for analyzing a piece of text.

BACKGROUND OF THE INVENTION

The advancement of information and computer technology has created significant impact on various aspects of our life including education. It has become a global trend to use e-Learning resources as a medium for learning and teaching both inside and outside the classroom. With the increasing popularity of e-Learning, a large variety of digital resources including e-text and e-textbooks have been developed.

Nevertheless, like the traditional learning materials, one difficulty faced by educators and parents is that it is generally difficult to evaluate whether the e-resources are of the appropriate level to meet the specific teaching or studying requirements. It is also difficult to determine whether the content of e-resources fulfill a particular learning purpose as desired. Most of the time, assessment is made according to the experience of the educators and the parents, which could be easily influenced by subjective views and therefore could be inaccurate.

OBJECTS OF THE INVENTION

An object of the present invention is to provide a computer-implemented method and system for analyzing a piece of e-text.

Another object of the present invention is to mitigate or obviate to some degree one or more problems associated with known e-text analytic products, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In general, the invention provides a computer-implemented method for analyzing a piece of text. The method comprises truncating one or more characters of the text into one or more block units each having at least one character. The method includes sorting the one or more block units for one or more unique block units and comparing the one or more unique block units with a grading database to thereby assign a grade to each of the one or more unique block units. An overall grade for the piece of text may be determined based on one or more of the grades assigned to each of the one or more unique block units. The overall grade of the text may be derived from successive truncating of the text into block units of increasing size and the successive processing of such block units.

In a first main aspect, the invention provides a computer-implemented method for analyzing a piece of text, the method comprising steps of truncating one or more characters of the text into one or more block units each having at least one character; sorting the one or more block units for one or more unique block units; and comparing the one or more unique block units with a grading database to thereby assign a grade to each of the one or more unique block units.

In a second main aspect, the invention provides a method of processing a computer readable medium storing machine readable instructions which, when implemented on a processor, implements the steps of the method of the first aspect.

In a third main aspect, the invention provides a system comprising a memory for storing data and a processor for executing computer readable instructions, wherein the processor is configured by the computer readable instructions when being executed to implement the method of the first aspect.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying FIGURE, of which:

FIG. 1 is a block schematic diagram showing a computer-implemented method and system for analyzing a piece of text according to the present invention.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGURE, may be implemented in various forms of hardware, software or combinations thereof. Preferably, these elements are implemented in a combination of hardware and software on one or more appropriately programmed general-purpose devices, which may include a processor, memory and input/output interfaces.

Referring to FIG. 1, shown is a block schematic diagram of a system for analyzing a piece of text. The piece of text can be any forms of writings such as articles, essays, stories, poems or literatures of any kind. In the context of this description, the text may comprise one or more characters in any language and optionally, one or more symbols such as punctuations. The term "character" is to be given a broad meaning to encompass the meaning of "letter", "word", "numeral", "ideogram", or the like.

The method can be implemented in a computer device 10 in any known form including desk top computer, laptop computer, tablet computer, smart phones, or any portable electronic smart devices. Preferably, the computer device 10 is connectable with a network 100, either private or public such as the internet, via a communication module 16 for exchanging information or data.

Specifically, the computer device 10 comprises an input interface 20 for inputting the text to be analyzed. Different inputting routes are shown in dotted-line in FIG. 1. For example, a user may typewrite the text via the computer input means 12, which may comprise, for example, a keyboard or a touch screen panel. The user may also open a pre-typed, scanned or saved text (e.g. in .txt, .doc, .pdf or .jpg format, etc.) which has been previously prepared and saved in the memory 14 of the computer device 10. The user may also download an E-article (e.g. in any of .txt, .doc, or .pdf format or any other format for electronic devices) of interest from the internet 100 via the communication module 16. In one embodiment, a user may also input the text by voice via any known voice recognition devices.

The inputted piece of text will subsequently be processed and analyzed by a processor 30. The processor 30 may comprise a plurality of functional blocks for performing various functions thereof. For example, the processor 30 includes a number of modules including the truncating module 30A, the sorting module 30B, the comparing module 30C, the assigning module 30D, and the associating module 30E, with their respective functions described as follows: First, the processor 30 will process the text, by the truncating module 30A, to truncate one or more characters of the text into one or more block units each having a first predefined number N of characters, where N is an integer and is greater than or equal to one. The truncating step is indicated as A in FIG. 1. In one embodiment, for example, during the first round of truncation, characters of the text are truncated into a plurality of block units each having one (1) character. These block units will then be sorted, as processed by the sorting module 30B, for one or more unique, i.e. non repeating, block units. The sorting step can be performed by, for example, scanning through the plurality of block units one by one along the text and subsequently, blocking, removing or ignoring any repeated block units being identified. Alternatively, the sorting can also be done by searching for any repeated block units among the plurality of block units and subsequently, blocking, removing or ignoring the repeated block units. Consequently, each of the sorted block units should be unique and different from one another. The sorting step is indicated as B in FIG. 1. In one embodiment, the number of repetition for each unique block unit can be outputted and/or displayed to the user.

The sorted, unique block units will then be compared, as processed by the comparing module 30C, against a grading database 120, which can be stored in the memory 14 of the computer device 10 or preferably, located in a remote network 100 as shown in the FIGURE. The comparing step is indicated as C in FIG. 1. The grading database 120 may comprise one or more databases provided by, for example, relevant educational bodies or authorities or other service providers, which individually or in combination, contain grading information for one or more characters of the unique block units or the block units themselves. The grading database 120 may optionally be updated by a system administrator and/or the relevant educational bodies or authorities or other service providers, whenever a new character, word, idiom or character string is developed or discovered or revision of the grading is required.

By comparing the unique block units with the grading information of the grading database 120, a grade can be assigned to each of the unique block units. The assigning step is indicated as D, and is processed by the assignment module 30D, as shown in FIG. 1. In one embodiment, the assigned grade of each of the unique block units can be outputted and displayed to the user by an output interface 40. The output interface 40 may also output a total number of the unique block units in each assigned grade in a statistical format such as a chart, so as to provide the user with a relative indication on the grading. Based on one or more or preferably all of the grades assigned to each of unique block units and/or the number of unique block units in each grade, a general overall grade for the piece of text with analysis based on unique block units with a specific number of character(s) (which is 1 in the above described example) can then be determined.

Likewise, depending on the specific settings and instructions from the user, the text can be truncated for block units having different number of characters. For example, block units having 2, 3, 4 or more characters for analyzing 2-word phrases, 3-word phrases, 4-word phrases or multiple-word phrases such as idioms or poems, respectively.

In one embodiment, successive truncation can be performed so as to provide an overall analysis on grading of the text. For example, after the first round of truncation in which block units each having N character (with N=1 in the previous example) are processed, the text can then be truncated into a plurality of block units each having a predefined number M of characters, with M being an integer and being larger in size than the first predefined number N. For example, characters of the text are then truncated into a plurality of block units each having two characters (M=N+1) during the second round of truncation. These block units of two characters will then be sorted for one or more unique block units, and subsequently matched and compared with the grading database 120 as described above. The process continues to repeat these steps with an increasing number of characters in each block unit. This successive truncating of the text into block units of increasing size and the successive processing of such block units will result in an overall grade of the text.

It is understandable that a piece of text will include punctuation between sentences and therefore, the rule of truncation may be intervened by, for example, a common or a full stop at the end of a phrase or a sentence. In this case, the block unit resulted from a last truncation before a punctuation would possibly have a number of characters less than the predetermined number. This block unit will still be processed under the same processing steps as the other block units.

In another embodiment, after the sorting step, each of the sorted, unique block units will be associated, as processed by an associating module 30E of the processor 30, with one or more characteristic fields before they are compared with the grading database 120 for grading. The one or more characteristic fields may relate to one or more characteristics comprising, but not limited to, at least one of (i) structure, (ii) meaning, (iii) property and (iv) pronunciation of the unique block units. Example of these characteristics may include, but not limited to, (i) structure: components, positioning of the components and/or number of the components (e.g. number of strokes), etc.; (ii) meaning: synonyms and/or autonyms, etc.; (iii) property: grammatical properties such as part of speech (e.g. noun, verb, adjective or the like), etc.; and (iv) pronunciation: phonetic transcription (e.g. pinyin), etc. The associating step is indicated as E in FIG. 1.

During the associating step, the characteristics will be determined or defined by characteristic data from one or more characteristic databases 140. For example, the "meaning" of a unique block unit may first be identified by comparing with the characteristic database 140 to confirm that the characters composing the block unit would give the block unit a possible or reasonable meaning. If the block unit is found to be merely a random combination of unrelated characters with no specific meaning, this block unit will not be processed further. On the other hand, if the block unit is found to have a meaning according to the characteristic database 140, this block unit will proceed to the next step for comparing with the grading database 120, and subsequently, be assigned with a grade.

Specifically, the unique block units associated with one or more characteristic fields (e.g. i, ii, iii, iv) will then be compared against a plurality of field sets (e.g. I, II, III, IV as shown in FIG. 1) of the grading database 120, wherein the field sets are categorized according to the one or more characteristic fields. For example, a unique block unit having one character with a structure of 5 stokes will be compared against the corresponding field set (i.e. structure) of the grading database 120 so as to assign a grade to the block unit based on the relative complexity of the structure of the character. Another unique block unit having two characters with a meaning (as defined or determined by comparing with the characteristic database 140) will be compared against the corresponding field set (i.e. meaning) of the grading database 120 so as to assign a grade to the block unit based on the relative difficulty of the meaning.

Optionally, results from the associating step, i.e. the association between one or more unique block units with the corresponding characteristics, can be stored in the memory unit 14 of the computer devices 10. This is advantageous in that, when a unique block unit having the same one or more characters is sorted during the analysis of another piece of text, the relevant association can be promptly retrieved from the memory 14 and thus, assists in speeding up the overall process time by the processor 30.

After the associating, comparing and assigning steps, the total number of the one or more unique block units in each characteristic field in each grade can be outputted via the output interface 40 in a statistical format such as a chart, so as to provide the user with a relative indication on the grading of the text based on the various characteristic fields.

Being similar to the grading database 120, the characteristic database 140 can be stored in the memory 14 of the computer device 10 or preferably, located in a remote network 100 as shown in the FIGURE. The characteristic database 140 may comprise one or more databases provided by the relevant educational bodies or authorities or other service providers, which individually or in combination, contain information for characterizing and defining one or more characters. Optionally, the characteristic database 140 may be updated by the system administrator and/or the relevant educational bodies or authorities or other service providers, whenever a new characteristic or definition of one or more characters is developed or discovered. In one embodiment, the characteristic database is one or more dictionary databases.

In a further embodiment, the processing steps including at least one of the truncating, sorting, associating, comparing and assigning steps can be performed in a local server or a remote server 180, instead of the processor 30 of the computer device 10. For example, the text can be uploaded to, and that the processing steps can be conducted in a webpage.

The present invention also relates a computer readable medium storing machine readable instructions which, when implemented on a processor 30, implements the steps of the method as described above.

The present invention further relates a system comprising a memory 14 for storing data and a processor 30 for executing a computer readable medium, wherein the processor 30 is configured by computer readable instructions when being executed to implement the method as described above.

The present invention is advantageous in that it provides an efficient and systematic analysis and evaluation of a piece of text, with the results being presented in an easily understandable format such as grading. The evaluation is conducted by comparing the content of the text with recognized, authoritative sources of information, without involving any subjective judgment by the user. The results are therefore reliable, objective and bias-free. The method and the system are implemented in a computer interface which is fast, effective and user-friendly. In one embodiment, the present invention can be applied in education such as E-learning, and specifically, for evaluating or confirming grading or levels of the electronic resources. The present invention can be easily adopted in both classroom and home learning environment for teachers, parents and students to gauge the learning progress. In another embodiment, the present invention can also be applied in any non-educational sectors which generally involve writing, editing and publishing etc.

The present invention enables effective, fast and efficient analysis of texts for grading purposes in a computationally efficient manner in that it involves one or more steps or routines which prevent or reduce the unnecessary processing of data. For example, a detailed analysis of a piece of literature having hundreds or thousands of words can be processed in seconds. In addition, a multiple number of texts can also be processed and analyzed simultaneously.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

What is claimed is:

1. A computer-implemented method for analyzing a piece of text, the method comprising steps of:
    truncating, by a truncating module, one or more characters of the text into one or more first block units each having a first predefined number N of characters, where N is an integer and is greater than or equal to one;
    sorting, by a sorting module, the one or more first block units to identify one or more non-repeating unique first block units by scanning through the first block units along the text thereof and subsequently, blocking, removing or ignoring any repeated first block units to leave only the non-repeating unique first block units;
    associating, by an associating module, each of the one or more unique first block units with one or more characteristic fields as defined by one or more characteristic databases; wherein the one or more characteristic fields relate to one or more characteristics comprising at least one of structure, meaning, property and pronunciation of a unique block unit, with the one or more characteristics being defined by data from the one or more characteristic databases;
    comparing, by a comparing module, the one or more unique first block units with a grading database having a plurality of field sets categorized according to the one or more characteristic fields to thereby assign a grade to each of the one or more unique first block units, wherein the grading database is updatable;
    successive truncating the text by the truncating module into one or more second block units each having a second predefined number M of characters, wherein M is an integer and is of an increasing size than the first number N by at least a value of 1; and
    repeating the sorting, associating and comparing steps at the respective modules to process the second block units to thereby provide an overall grade of the piece of text based on the one or more characteristic fields.

2. The computer-implemented method according to claim 1, further comprising a step of outputting the assigned grade of each of the one or more unique block units.

3. The computer-implemented method according to claim 1, further comprising a step of outputting a total number of the one or more unique block units in the or each assigned grade.

4. The computer implemented method of claim 1, further comprising a step of outputting the overall grade for the piece of text based on one or more of the grades assigned to the one or more unique block units.

5. The computer-implemented method according to claim 1, further comprising a step of outputting a total number of the one or more unique block units in each characteristic field in each grade.

6. The computer-implemented method according to claim 1, wherein the steps are implemented by a processor of a computer device.

7. The computer-implemented method according to claim 1, wherein the steps are implemented by a network server.

8. The computer-implemented method according to claim 1, further comprising a step of storing results from the associating step in a memory unit.

9. A non-transitory computer readable medium storing machine readable instructions which, when implemented on a processor, implements the steps of the method of claim 1.

10. A system comprising a memory for storing data and a processor for executing non-transitory computer readable instructions, wherein the processor is configured by the computer readable instructions when being executed to implement the method of claim 1.

* * * * *